Dec. 28, 1954     E. L. GINZTON     2,698,398
TRAVELING WAVE ELECTRON DISCHARGE DEVICE
Filed April 7, 1949                                     2 Sheets-Sheet 1

INVENTOR
EDWARD L. GINZTON
BY
Paul B. Hunter
ATTORNEY

Dec. 28, 1954          E. L. GINZTON          2,698,398
TRAVELING WAVE ELECTRON DISCHARGE DEVICE
Filed April 7, 1949                 2 Sheets-Sheet 2

INVENTOR
EDWARD L. GINZTON
BY
Paul B. Hunter
ATTORNEY

Patented Dec. 28, 1954

2,698,398

TRAVELING WAVE ELECTRON DISCHARGE DEVICE

Edward L. Ginzton, Menlo Park, Calif., assignor to The Board of Trustees of the Leland Stanford Junior University, Stanford University, Calif.

Application April 7, 1949, Serial No. 86,018

4 Claims. (Cl. 315—6)

This invention relates to improvements in electron discharge tubes, and more particularly to tubes of the so-called "traveling wave" type, wherein amplification of a wave is produced by the cumulative addition of energy to a wave in a distributed manner throughout its passage along a conduit such as a wave guide.

One of the principal objects of the present invention is to provide travelling wave tubes utilizing velocity modulation of an electron stream which travels transversely of the direction of wave propagation.

More specifically, it is an object of the invention to provide travelling wave amplifier devices having separate input and output wave conduits which may be coupled unilaterally by an electron stream, whereby no energy is transferred from the output conduit to the input conduit.

Another object is to provide travelling wave tubes wherein the electron stream may be made of substantially any desired cross sectional area, without requiring any elaborate focussing means.

A further important object of the invention is to provide travelling wave tubes particularly adapted to broadband operation, in that they include no resonator elements.

Figure 1:
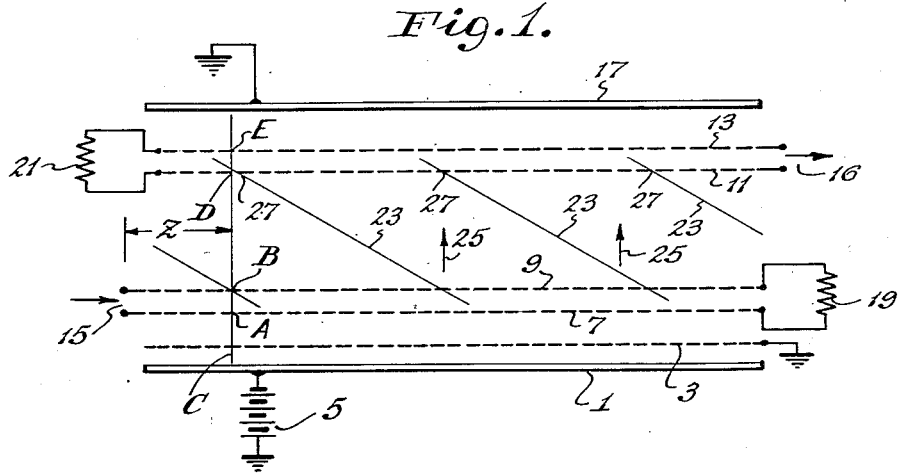
Figure 2:
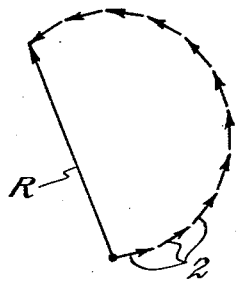
Figure 3:
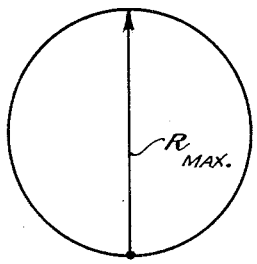
Figure 4:
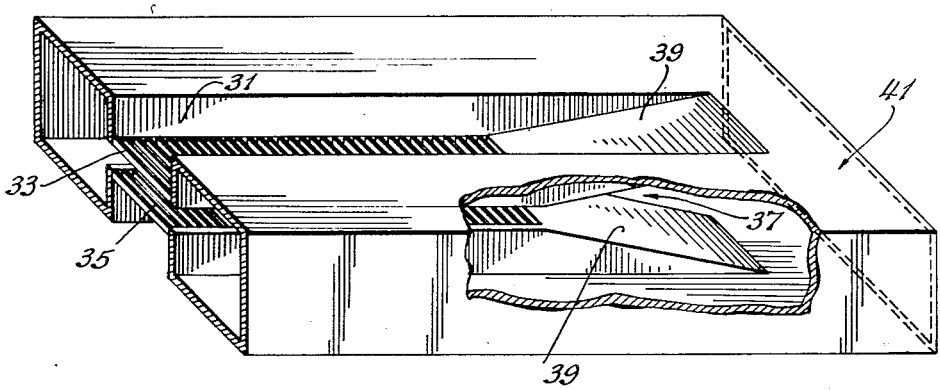
Figure 5:
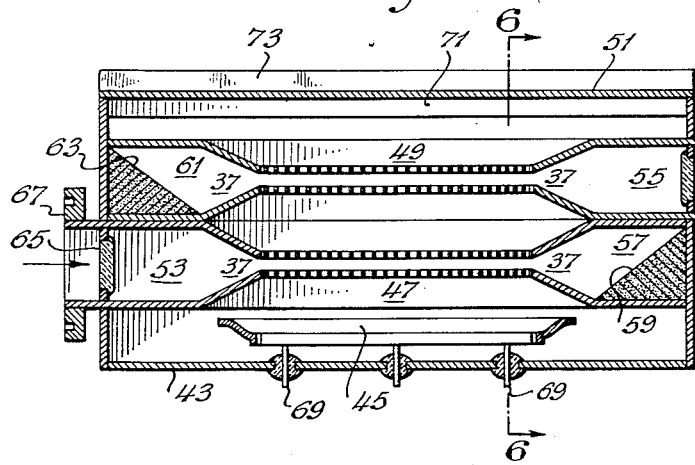
Figure 6:
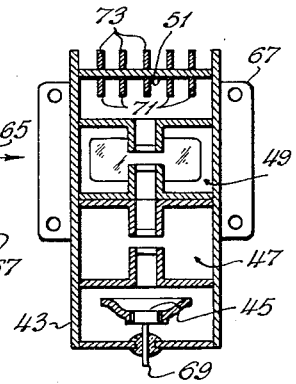
Figure 7:
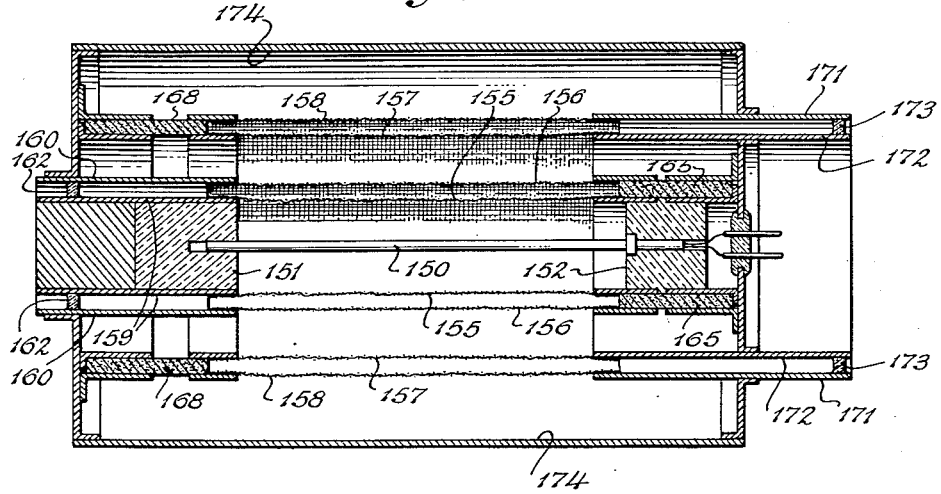
Figure 8:
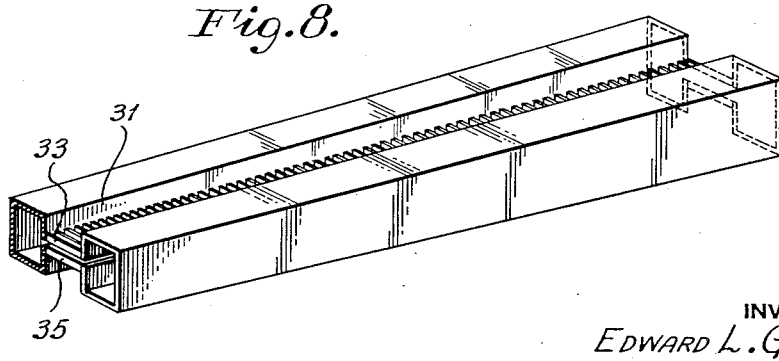

The invention will be described with reference to the accompanying drawings, wherein:

Fig. 1 is a diagram showing schematically a structure which embodies the present invention and illustrating the principle of operation thereof, Figs. 2 and 3 are vector diagrams illustrating the operation of the structure of Fig. 1, Fig. 4 is a perspective view of a section of reentrant wave guide adapted to be used in devices like that of Fig. 1, Fig. 5 is a longitudinal section of a travelling wave amplifier tube designed in accordance with the invention, Fig. 6 is a transverse section in the plane 6—6 of Fig. 5, Fig. 7 is a longitudinal section of a modified embodiment of the invention, and Fig. 8 is a perspective view of a modification of Fig. 4.

Referring to Fig. 1, a cathode 1 which may be in the form of a relatively long narrow strip is provided with an electron emitting surface. Two electron permeable conductive sheets or grids 7 and 9 are positioned near each other and in the vicinity of the cathode, the grid 7 being nearer the cathode. An accelerating electrode 3, which also may be in the form of a grid, is provided between the cathode 1 and the grid 7. A D.-C. source 5 is connected to maintain the electrode 3 at a positive potential with respect to the cathode 1. As an alternative, the electrode 3 may be omitted and the grid 7 used as an accelerating electrode.

A collector electrode 17 is disposed in substantially spaced generally parallel relationship to the cathode 1 and the grids 7 and 9, and is connected to the positive terminal of the source 5. A second pair of electron permeable sheets or grids 11 and 13 is provided in the vicinity of the collector electrode. All of the described elements, except the source 5, may be enclosed in an evacuated envelope, not shown in Fig. 1.

The grids 7 and 9 are arranged to form a transmission line or wave guide for oscillatory energy applied to the terminals 15. The line or wave guide 7, 9 is terminated at its righthand end in its characteristic impedance $Z_0$ by a dissipative device such as a resistor 19. The grids 11 and 13 form a similar wave guide or line, which is terminated at its left-hand end by a resistor 21.

In the operation of the structure of Fig. 1, the high frequency signal to be amplified is applied to the terminals 15, producing a wave which travels along the line 7, 9 to the terminating resistor 19. Here the energy of the wave is substantially completely absorbed, so that no reflections or standing waves occur on the line. The instantaneous difference in voltage between any corresponding points such as the points A and B on the grids 7 and 9 varies in the same manner as the instantaneous voltage between the input terminals 15, but is delayed with respect thereto by the time required for wave propagation over the distance z from the terminals 15 to the points A and B.

Electrons emitted from the point C on the cathode 1 are accelerated by the electrode 3 and enter the space A—B at substantially uniform velocity. The electric field between A and B alternately accelerates and decelerates the electrons passing between the grids 7 and 9, causing the electron stream emerging from the point B to be velocity modulated. In travelling from the point B to the point D on the grid 11, the electrons tend to converge into bunches, because the faster moving electrons overtake earlier-emitted slower moving electrons at some point whose distance from the point B depends upon the average electron velocity (i. e. the accelerating voltage) and upon the range of variation of electron velocity (i. e. the input voltage amplitude). The bunching action is the same as that which takes place in velocity modulation tubes of the klystron type.

The accelerating voltage and/or the input voltage may be adjusted to produce maximum bunching in the neighborhood of the space D—E. The bunches of electrons, in passing across the space D—E, induce a voltage between the points D and E alternating at the same fundamental frequency as that of the passage of bunches of electrons, which is the same as that of the input to the terminals 15. This phenomenon is substantially the same as that by which oscillations are built up in the "catcher" of a klystron tube.

The effect is the same as if a radio frequency generator were connected between the points D and E, and waves are initiated in the line 11, 13 travelling both ways from the points D and E. The energy is supplied by changes in the velocities of the electrons as they pass through the space D—E. Since this energy originates in the source 5, the power available at D—E can be considerably greater than that supplied at A—B. The electrons emerging from the point E are collected by the electrode 17.

Owing to the propagation of the input wave down the line 7, 9, the above described velocity modulation of the electron stream takes place at each successive longitudinal element of the line 7, 9 with a time phase which is progressively retarded. The substantially uniform sheet-like streams of electrons issuing from the acceleration electrode 3 becomes bunched along lines such as the lines 23 in Fig. 1. As the bunches move in the direction of the arrows 25, they traverse the length of the line 11, 13 like waves striking a beach obliquely.

Assuming the velocity of wave propagation along the line 11, 13 to be the same as that along the line 7, 9, it will be evident that the points 27 where the bunching lines 23 intersect the line 11, 13 will travel and remain in phase with the waves propagating from left to right on the line 13. Thus the wave is continuously reinforced and "grows" or increases in amplitude as it travels toward the output terminals 16.

The voltage induced by the bunched electron stream across each longitudinal element of the line 11, 13 produces a wave component travelling to the left, in addition to the useful wave component travelling to the right. However, the leftward- or backward-travelling components do not add up in phase, and tend to cancel each other so that little or no energy actually flows to the terminating resistor 21. This phenomenon is analogous to that occurring in the operation of a slot type directional coupler, and may be explained as follows:

Consider the voltage induced across the line element nearest the resistor 21 as a phase reference. Each successive element in the direction of the output terminals contributes a component which is delayed according to the distance along the line from the reference element, and is further delayed an equal amount in travelling back to the reference element. The vectors V representing the contributions of the successive elements may be added tip to tail, as shown in Fig. 2, and it is seen that they will be on a curve, owing to their successive displacement in phase. Their resultant is the vector R.

If the length of transmission line under consideration is one half wavelength, the curve will be a complete circle, since the contribution of the last element will be in phase with the first, and the resultant R will be zero. If the elements and their respective contributions are made vanishingly small the locus of the tip of the resultant is a smooth circular curve as shown in Fig. 3. Preferably the structure of Fig. 1 is designed to be several wavelengths long, at the lowest frequency of operation. The curve of Fig. 3 is then not only a circle, but is traversed several times, say N.

The maximum amplitude $R_{max}$ of the backward-travelling wave at the resistor 21 can never be more than is represented by the diameter of the circle, whatever the frequency. The amplitude of the forward-travelling wave, however, is the linear sum of all of the contributing vectors and is represented by N times the circumference of the circle. Thus the amplitude of the forward-travelling wave will be at least $\pi N$ times that of the backward-travelling wave, where $$N = \frac{2l}{\lambda}$$

$l$ being the total length of line 11, 13 and $\lambda$ the wavelength.

As a concrete example, suppose the line to be about three wavelengths long. When the input frequency is such as to make the length exactly three wavelengths, the circle shown in Fig. 3 will be traversed exactly six times and the amplitude of the backward-travelling wave will be zero. Now if the frequency is changed to make the length three and one quarter wavelengths, the backward-travelling wave will be at a maximum. However, the forward travelling wave is $6.5\pi$ or about 20.5 times as great, and the backward-travelling wave is less than five percent of the forward wave.

It is apparent that the device of Fig. 1 may readily be designed to ensure that substantially all of the energy extracted by the line 11, 13 from the bunched electron stream will be available at the output terminals 16. Also it is to be noted that there is no way for energy in the line 11, 13 to get back to the line 7, 9, because the lines are coupled unilaterally by the electron stream. Hence there is no possibility of undesired oscillations being started or maintained by any energy travelling backward in the line 11, 13.

Under operating conditions, the efficiency of conversion of the energy of the bunched electron stream into wave energy on the line 11, 13 will be different at different longitudinal elements of the line because the steady state voltage amplitudes are different. Thus, at the extreme left-hand end of the line 11, 13, the efficiency may be very low. At successive points toward the right-hand end, the fields already present across the line react more strongly with the bunched electrons, and more energy is extracted. Finally, if the line is long enough, the amplitude of the oscillating voltage across it will become equal to the accelerating voltage. Beyond this point, no additional energy is extracted from the electron stream. This statement is made with the assumption that the characteristic impedance of the line 11, 13 is the same throughout its length.

The tube can be designed to have greater overall efficiency by providing a section wherein the voltage on the output line 11, 13 builds up to an amplitude approximately equal to the accelerating voltage followed by a section in which the characteristic impedance of the line 11, 13 tapers, becoming progressively lower toward the output end. The voltage across any longitudinal element of the line is the product of the current and the characteristic impedance; thus, in the tapered line, the current in the line may be made to increase progressively toward the output end, while the voltage remains constant at or near the optimum value.

It is within the contemplation of the invention to use the amplifier device of Fig. 1 as an oscillator by providing coupling from the output line 11, 13 to the input line 7, 9. One method of producing self sustained oscillation is to couple the output terminals 16 back to the input terminals 15 through a suitable attenuator device. A certain length of transmission line or wave guide may be included to provide the proper phase relationship between the terminals 15 and 16.

The electron bunches will ordinarily have a density distribution which is other than sinusoidal, and the voltage induced in the output line may include harmonics of the input. The intensity of these harmonics depends upon the degree of bunching of the electrons arriving at the line 11, 13 and may be made a maximum by proper adjustment of the accelerating voltage. The device of Fig. 1 may be used as a harmonic generator by selecting the desired harmonics in the wave which appears on the line 11, 13, as by designing the line 11, 13 to have a velocity of propagation for the desired harmonics equal to the velocity of propagation of the fundamental along the line 7, 9.

Turning now to Figs. 4, 5 and 6, a physical embodiment of the structure schematically shown in Fig. 1 will be described. The lines 7, 9 and 11, 13 are preferably constructed in the form of recessed or indented wave guides as shown in Fig. 4. These guides differ from the ordinary rectangular wave guides in the inclusion of reentrant portions 31 in the broad sides of the guide, with electron permeable grids 33 and 35 disposed adjacent each other and in the opposed recesses. This construction provides a concentrated electric field in the vicinity of the grids 33 and 35 and also results in a wave guide having relatively low characteristic impedance and a broad band transmission characteristic. The grids may be omitted, leaving only longitudinal slots in the recesses. In this case the edges of the slots act as electrodes. The recessed guide may be coupled to a conventional rectangular guide by means of a tapered transition section such as that shown at 37, including sloping conductive walls 39 which gradually diverge from the ends of the grids 33 and 35 to merge with the broad sides of the rectangular guide 41.

Referring to Fig. 5, an evacuated envelope 43, which may be and preferably is metallic, surrounds the structure comprising a cathode 45, wave guides 47 and 49 and collector electrode 51. The wave guides 47 and 49 are recessed as shown in Fig. 4 and coupled by transition sections 37 to input and output wave guides 53 and 55, respectively. The right-hand end of the wave guide 47 is coupled through the transition section 37 to the rectangular guide 57 which is terminated by a wedge-shaped body 59 of carbon or other lossy material. The device 59 is the equivalent of the terminating resistor 19 in Fig. 1. The left-hand end of the wave guide 49 is similarly terminated by a short section 61 of rectangular guide including a wedge 63. The input and output wave guide sections 53 and 55, respectively, are sealed by windows 65 and may be coupled by suitable joints 67 externally of the tube to the supply and utilization means.

The cathode 45 is energized by means of leads 69 sealed in the wall 43 and insulated therefrom. As shown in Fig. 1, the cathode may be maintained at a high negative potential with respect to the remainder of the structure. The opposed walls of the reentrant portions of the wave guides 47 and 49 are preferably provided with grids such as those shown in Fig. 4, said grids being equivalent in function to the grids 7, 9, 11 and 13 of Fig. 1. The gap between the reentrant portions of the guide 47 is spaced from that between the reentrant portions of the guide 49 to provide drift space for the formation of bunches as described in connection with Fig. 1.

The collector electrode 51 may be provided with internal fins 71 to substantially eliminate the production of secondary electrons and with external fins 73 to facilitate cooling. There is no counterpart in Fig. 5 for the accelerating electrode 3 of Fig. 1, the electron accelerating function being performed by the lower grid in the reentrant wave guide 47.

The adjustment and operation of the device of Fig. 5 are substantially the same as that described in connection with Fig. 1. The sheet-like stream of electrons emitted from the cathode 45 travels through the gap between the grids in the indented wave guide 47 and is velocity modulated, arriving at the gap between the grids in the guide 49 in bunches disposed at an angle, and inducing a wave travelling from left to right in the guide 49. Any input signal reaching the right-hand end of guide 47 is dissipated in the termination 59, and any backward flowing energy in the guide 49 is similarly dissipated in the device 63. If high efficiency is an important consideration, the characteristic impedance of the guide 49 may be tapered as described above. This can be effected by making the cross sectional area of the wave guide 49 progressively smaller and by reducing the spacing between the reentrant portions toward the output end, in such manner as to keep the propagation velocity the same as in the guide 47. This structure is shown in Fig. 8 of the drawing.

The structure of Fig. 5 may be used as an amplifier or may be operated as a frequency multiplier, as mentioned in connection with Fig. 1. In the latter function it is preferable to design the wave guide 49 to have a cut-off frequency in excess of the highest fundamental frequency to be supplied to the input guide 47. This may be accomplished by making the guide 49 of smaller dimensions than the guide 47.

Although the invention has been described thus far as applied to structures involving the use of a sheet-like stream of electrons, it may also be embodied in widely different forms. For example, Fig. 7 shows a tube which is similar to a figure of revolution of the device of Fig. 5 about an axis through the cathode. The cathode 150 in this case is cylindrical and is surrounded coaxially by cylindrical grids 155, 156, 157 and 158 and a collector electrode 174. The electrode 174 forms a portion of the evacuated envelope. The grids 155 and 157 form inner and outer conductors, respectively, of a coaxial transmission line and are supported at one end by the respective conductors 159 and 160 of a coaxial input line. The input line is sealed by an annular window 162. The right-hand end of the line 155, 156 is terminated in an annular body 165 of resistive material. The cathode 150 is supported at its ends in cylindrical blocks 151 and 152 of insulation.

The outer conductor 156 of the inner line is separated from the inner conductor 157 of the outer line by a radial drift space. The coaxial electron permeable conductors 157 and 158 of the outer line are terminated at their left-hand end in an annular block of resistive material 168, and are supported at their right-hand end by solid tubular conductors 172 and 171 which are sealed by an annular window 173 and form the output terminals of the device.

In the operation of the device of Fig. 7 the cathode is maintained at a high negative potential with respect to the rest of the structure. Electrons are emitted radially in all directions laterally of the cathode. The grids 155 and 156 modulate the velocity of the electrons substantially in the same manner as has already been described, and the resulting bunches, which are conical in form with the axis of the cone coincident with that of the cathode, cross the annular cylindrical space between the grids 157 and 158. This induces a wave in the coaxial line formed by the grids 157 and 158 which moves from left to right in Fig. 7. The output is supplied to the utilization device through the coaxial line section 171, 172.

The structure of Fig. 7 may be used in various ways, as described in connection with Fig. 5. Both the structures of Figs. 5 and 7, enable the use of an electron stream having a relatively large cross-sectional area and therefore having high power handling capabilities without stringent focussing requirements. The cathode 150 may be made much larger in diameter than that shown, and in fact may be made in annular form surrounding open grids 157, 158, in which case these grids would be the input grids and the collector 174 would be within the output grids 155, 156.

It will be apparent to those skilled in the art that certain other modifications may be made within the scope of the invention. The embodiment of Fig. 7 is similar to a figure of revolution of Fig. 1 about an axis near the cathode; other useful structures are suggested by rotation of Fig. 1 about other axes, such as one near the collector electrode.

It is intended that all matter contained in the above description or shown in the accompanying drawings shall be interpreted as illustrative and not in a limiting sense.

What is claimed is:

1. An electron discharge device comprising a wave transmission conduit adapted to carry travelling waves of high frequency electromagnetic wave energy, means including a cathode laterally adjacent said conduit for producing a stream of electrons flowing across said conduit transversely to the direction of wave propagation therein, said stream having an extent along said conduit substantially greater than the transverse width of said conduit and large as compared to the longest wavelength to be carried by said conduit, and means between said cathode and said conduit for velocity modulating the electrons in said stream to form bunches crossing said conduit and producing travelling waves therein, said cathode being in the form of a long relatively narrow strip, said means for velocity modulating said electrons comprising an input wave guide having a longitudinal electron permeable portion substantially parallel to said cathode, and said wave transmission conduit comprising an output wave guide having a longitudinal electron permeable portion substantially parallel to said portion of said input wave guide and separated therefrom by a drift space.

2. The device as claimed in claim 1, wherein said output wave guide includes a portion which is of progressively decreasing cross sectional area in the direction of wave propagation therein.

3. An electron discharge device comprising a wave transmission conduit adapted to carry travelling waves of high frequency electromagnetic wave energy, means including a cathode laterally adjacent said conduit for producing a stream of electrons flowing across said conduit transversely to the direction of wave propagation therein, said stream having an extent along said conduit substantially greater than the transverse width of said conduit and large as compared to the longest wavelength to be carried by said conduit, and means between said cathode and said conduit for velocity modulating the electrons in said stream to form bunches crossing said conduit and producing travelling waves therein, said wave transmission conduit comprising a wave guide having opposed longitudinally extending electron-permeable wall portions, at least one of said wall portions being reentrant.

4. The device as claimed in claim 3, including means terminating said wave guide in its characteristic impedance to substantially prevent resonance therein.

References Cited in the file of this patent

UNITED STATES PATENTS

| Number | Name | Date |
|---|---|---|
| 2,109,843 | Kassner | Mar. 1, 1938 |
| 2,122,538 | Potter | July 5, 1938 |
| 2,368,031 | Llewellyn | Jan. 23, 1945 |
| 2,402,184 | Samuel | June 18, 1946 |
| 2,420,342 | Samuel | May 13, 1947 |
| 2,450,026 | Tomlin | Sept. 28, 1948 |
| 2,457,524 | Bowen | Dec. 28, 1948 |
| 2,509,374 | Sunstein | May 30, 1950 |
| 2,512,980 | Sunstein | June 27, 1950 |
| 2,559,581 | Bailey | July 10, 1951 |